United States Patent [19]

Engel et al.

[11] Patent Number: 5,006,617

[45] Date of Patent: Apr. 9, 1991

[54] EMULSION POLYMERS FREE FROM EMULSIFIERS AND PROTECTIVE COLLOIDS, A PROCESS FOR THEIR PREPARATION AND THEIR USE

[75] Inventors: Dieter Engel, Kelsterbach; Helmut Rinno, Hofheim am Taunus, both of Fed. Rep. of Germany

[73] Assignee: Hoechst Aktiengesellschaft, Frankfurt am Main, Fed. Rep. of Germany

[21] Appl. No.: 248,348

[22] Filed: Sep. 20, 1988

Related U.S. Application Data

[63] Continuation of Ser. No. 931,436, Nov. 12, 1986, abandoned, which is a continuation of Ser. No. 767,244, Aug. 20, 1985, Pat. No. 4,665,142, which is a continuation of Ser. No. 600,325, Apr. 13, 1984, abandoned.

[30] Foreign Application Priority Data

Apr. 16, 1983 [DE] Fed. Rep. of Germany ....... 3313922

[51] Int. Cl.$^5$ ............................................. C08F 236/00
[52] U.S. Cl. ................................ 526/87; 526/323.1; 526/323.2; 524/458; 524/460
[58] Field of Search ................ 526/87, 323.1, 323.2; 524/458, 460; 528/501

[56] References Cited

U.S. PATENT DOCUMENTS

| | | | |
|---|---|---|---|
| 4,089,828 | 5/1978 | Vasishth | 260/29.6 |
| 4,151,146 | 4/1979 | Patella | 526/323.2 |
| 4,163,838 | 8/1979 | Kalka | 528/501 |
| 4,246,156 | 1/1981 | Heins | 524/460 |
| 4,415,700 | 11/1983 | Batz | 524/548 |
| 4,440,897 | 4/1984 | Maska | 524/460 |
| 4,459,378 | 7/1984 | Ugelstad | 524/460 |
| 4,665,142 | 5/1987 | Engel et al. | 526/87 |

OTHER PUBLICATIONS

European Patent Application No. 0007042.

*Primary Examiner*—Charles L. Bowers, Jr.
*Assistant Examiner*—Lee C. Wright
*Attorney, Agent, or Firm*—Berman, Aisenberg & Platt

[57] ABSTRACT

The preparation of polymers free from emulsifiers and protective colloids by the free-radical initiated emulsion polymerization of ethylenically unsaturated copolymerizable monomers, wherein the emulsion polymerization is carried out in the absence of emulsifiers and protective colloids, using water-soluble, free-radical forming initiators and with the addition, at least at the start of the polymerization, of at least 0.01% by weight, based on the total amount of monomers, of poly-(ethylenically unsaturated) monomers, and the polymers can be obtained in the form of aqueous or non-aqueous dispersions or in the form of powder.

The use of the polymers in the form of dispersions or powders for modifying polymer materials and polymer raw materials and for the production of shaped articles and films.

14 Claims, No Drawings

EMULSION POLYMERS FREE FROM EMULSIFIERS AND PROTECTIVE COLLOIDS, A PROCESS FOR THEIR PREPARATION AND THEIR USE

This application is a continuation of Ser. No. 931,436, filed Nov. 12, 1986 (now abandoned) which is a continuation of application Ser. No. 767,244 (now U.S. Pat. No. 4,665,142), filed Aug. 20, 1985, which is a continuation of application Ser. No. 600,325 (now abandoned), filed Apr. 13, 1984.

The invention relates to emulsion polymers free from emulsifiers and protective colloids, a process for their preparation and their use in the form of dispersions or powders for modifying polymer materials or for the production of shaped articles, especially film.

Aqueous polymer dispersions free from emulsifiers are already known (cf. European Patent A 0,054,685 and German Offenlegungsschrift 3,106,502). A factor common to all of them is that, in order to achieve adequate stability at a high solids content, they require either the use of protective colloids or at least the use of at least one hydrophilic monomer. In accordance with European Patent A 0,054,685 it is therefore preferable to carry out polymerization with monomer fractions composed of glycidyl methacrylate, while in accordance with German Offenlegungsschrift 3,106,502 polymerization is carried out in the presence of emulsifier acids which are soluble in organic solvents.

In accordance with European Patent A 0,054,685 polymerization is carried out in a batch process, the entire quantity of monomer being charged initially. In this case, however, even if polyunsaturated monomers are concomitantly used, only dispersions having a very low solids content (approx. 10% by weight) are obtained, and the monomer conversion is incomplete. In addition, carefully purification of the monomeric starting materials is necessary. The polymerization itself must be carried out under a protective gas. As a rule, however, it is advantageous in the preparation of polymer dispersions to employ formulations having fairly high solids contents in order, on the one hand, to achieve fairly high space-time yields and, on the other hand, to prevent, for example, excessively rapid deposition of the polymer particles in the dispersion. In various applications of dispersions of this type it is necessary to remove the water they contain, and it is, of course, advantageous if the dispersion already contains as little water as possible et the outset. Furthermore, it i$ a disproportionate additional expense for syntheses on a large industrial scale when starting materials have to be highly purified, as is required in accordance with European Patent A 0,054,685.

When the dispersions are employed as systems or as mixing components for modifying polymer materials or other materials, such as, polymer raw materials for thermoplastic processing, the water-soluble and/or hydrophilic additives mentioned in German Offenlegungsschrift 3,106,502 for stabilizing the dispersion can have a disadvantageous effect for a wide variety of end uses, in that floating of the stabilization additives which are not fixed by a covalent bond can occur in the finished product, as a result of which the properties of the product can be severely impaired. For example, the heat stability or the thermal stability under load of polymer materials modified in this manner can be adversely affected by such extraneous substances which are not fixed by a covalent bond.

If dispersion polymers are used on their own it is also possible for such stabilizing ingredients, not fixed by a covalent bond, to affect the polymer properties adversely and to exclude various applications.

The invention was therefore based on the object of developing emulsion polymers which are free from emulsifiers and protective colloids, which do not have the disadvantages described above and which preferably have a narrow distribution of particle size, $D_w/D_n \leq 1.2$, particularly within the particle diameter range between 0.02 μm and 5 μm. The dispersions of such organic polymers should also, at a relatively high solids content, be substantially free from any stabilization additives which are not fixed by a covalent bond, and should, nevertheless, also have an adequate stability on storage and stability to heat.

Dispersions of organic polymer particles having average particle diameters between 0.02 and 5 μm can, for example, be employed very advantageously for modifying various materials, in particular polymer materials. For example, it is essential in numerous applications of organic polymer dispersions or polymers that the dispersions employed or the polymers should be free from emulsifiers and protective colloids or should in certain cases only contain negligible amounts thereof. Nevertheless, the dispersion must, however, be stable on storage and $table to heat and also free from residual monomers and insensitive to coagulation or agglomeration when stored or when used in a system with which it is to be mixed.

On the other hand, pulverulent emulsion polymers which are free from emulsifiers and protective colloids offer interesting fields of use, for example in sectors hitherto reserved for suspension polymers, particularly sheets.

It is now possible, surprisingly, to achieve this object by means of emulsion polymers or dispersions thereof which are obtained by polymerizing ethylenically-unsaturated monomers in an aqueous system in the absence of acyclic olefins with conjugated double bonds, e.g. di- and tri-(ethylenically unsaturated) compounds other than acyclic conjugated olefins, emulsifiers and protective colloids, using free-radical initiators which are partly or completely soluble in water, it being necessary, at least at the start of polymerization, for a poly-(ethylenically unsaturated) compound to be present in the polymerization mixture in an amount of more than 0.01% by weight, based on the total amount of monomer. In a preferred variant of the invention, it is possible to obtain thereby polymer dispersions which are free from emulsifiers and protective colloids and have an average particle diameter between 0.02 and 5 μm at a narrow particle size distribution ($D_w/D_n \leq 1.2$). Polymer dispersions which are particularly preferred in this respect are those having particle diameters between 0.05 and 2.0 μm and a particle size distribution $D_w/D_n \leq 1.05$.

The particle size distribution $D_w/D_n$ is a numerical measure for assessing the uniformity of particles in a dispersion. It is defined as the ratio of the weight average of the particle diameter$ ($D_w$) and the number average of the particle diameters ($D_n$). In the event of complete uniformity it can assume the value 1. Non-uniformity is characterized by numerical values greater than 1 (cf. U.E. Woods et al., Journal of Paint Technology, Volume 40, No. 527 (1968), page 545). The determination of particle size can be effected by known methods, for example by the electron microscope (cf. S.H. Maron et al., Journal of Appl. Physics, Volume 23 (1952), page 900). It is thus possible, for comparison purposes, to characterize a latex or a polymer dispersion in respect of the uniformity of the particle size distribution by quoting a single figure, namely the proportionality factor $D_w/D_n$.

Corresponding non-aqueous polymer dispersions which are free from emulsifiers and protective colloids can be obtained in accordance with the invention either by carrying out the polymerization in a homogeneous mixture of water and a water-miscible non-aqueous phase as the dispersing medium, or by mixing the water-miscible, non-aqueous phase with the aqueous dispersion when polymerization is complete, and in either case subsequently removing the water more or less completely from the mixture. This can be effected, for example, by distillation. Vacuum distillation is particularly preferred.

The emulsion polymers can be obtained from the aqueous polymer dispersions in e dry powder form free from emulsifiers and protective colloids by removal of water. The removal of water can be effected, for example, by spray drying, freeze-drying or thin-film evaporation. Spray drying is preferred.

The invention relates, therefore, to a process for the preparation of polymers free from emulsifiers and protective colloids by the free-radical initiated emulsion polymerization of ethylenically unsaturated, copolymerizable monomers, which comprises first subjecting to preliminary polymerization, in the absence of emulsifiers and protective colloids and using one or more water-soluble, free-radical forming initiators in an aqueous emulsion, an amount or partial amount of the poly-(ethylenically unsaturated), copolymerizable monomer of at least 0.01% by weight, preferably 0.01 to 20% by weight, particularly preferentially 0.02 to 10% by weight and especially 0.1 to 5% by weight, based on the total amount of monomers, if appropriate on its own or, preferably, together with a partial amount of the mono-(ethylenically unsaturated) monomers of preferably 0.5 to 40% by weight, particularly preferentially 1 to 30% by weight and especially 1.5 to 15% by weight, based on the total quantity of monomers, and then metering in the residual amount of the mono(ethylenically unsaturated) monomer and, if appropriate, the residual amount of the poly-(ethylenically unsaturated) monomer and, if appropriate, the residual amount of initiator, completing the polymerization of the mixture and, if appropriate, subsequently isolating the polymers from the resulting dispersion.

The content of disperse, polymeric solids in the resulting polymer dispersions is preferably 20 to 55% by weight, especially 25 to 45% by weight, based on the dispersion.

The process can be carried out discontinuously or continuously.

In accordance with the invention, the polymers are preferably in the form of a dispersion or a dry powder. They can, however, also constitute shaped articles, especially film.

Polymers according to the invention which are preferred are those in which the polymeric solid particles have a diameter within the range from 0.02 to 5 μm, preferably 0.05 to 2.0 μm, and a narrow particle size distribution, so that the ratio of the weight average of the particle diameters ($D_w$) and the number average of the particle diameters ($D_n$) is preferably <1.2, particularly preferentially <1.1 and especially <1.05.

The invention also relates to the polymers and polymer dispersions prepared by the process according to the invention, it being possible for the dispersing medium in the dispersions to be aqueous and/or nonaqueous.

Suitable ethylenically unsaturated monomers are virtually all monomers which can be polymerized by free radicals, but the customary limitations prescribed by the Q-diagram and e-diagram of Alfrey and Price and/or the copolymerization parameters apply to copolymerization reactions (cf., for example, Brandrup and Immergut, Polymer Handbook, 2nd edition (1975), John Wiley & Sons, New York) It should be pointed out explicitly that, in general, the presence of hydrophilic monomers is not necessary, but is possible, for carrying out the polymerization reactions according to the invention.

The following are examples of types of ethylenically unsaturated monomers which can be employed. a) Monomers of the methacrylate type, preferably methyl methacrylate, n-butyl methacrylate, 2-ethylhexyl methacrylate, ethyl methacrylate, glycidyl methacrylate, hydroxyethyl methacrylate, hydroxypropyl methacrylate, glycidyl methacrylate, methacrylamide, N-methylolmethacrylamide, methacrylonitrile, tert.-butyl methacrylate and methacrylic acid, b) Monomers of the acrylate type, preferably ethyl acrylate, propyl acrylate, n-butyl acrylate, tert.-butyl acrylate, 2-ethylhexyl acrylate, acrylic acid, acrylonitrile, glycidyl acrylate and tert.-butyl acrylate, c) Monomers of the vinyl-aromatic type, preferably styrene, vinyltoluene and vinylpyridine, d) Monomers of the vinyl ester type, preferably vinyl acetate, vinyl esters of branched ($C_9$–$C_{12}$)-carboxylic acids, such as vinyl versatate, and vinyl linoleate, e) Monomers of the type of other monocarboxylic and dicarboxylic acids, preferably crotonic acid, maleic acid, itaconic acid or esters or half-esters thereof, f) Monomers of unsaturated halogen compounds, prefer vinyl chloride or vinylidene chloride, g) Monomers of the type of poly-(ethylenically unsaturated) compounds, e.g. die- and tri-(ethylenically unsaturated) compounds other than acyclic conjugated olefins, preferably divinylbenzene, ethanediol diacrylate, ethanediol dimethacrylate, propanediol diacrylate, propanediol dimethacrylate, butanediol diacrylate, butanediol dimethacrylate, hexanediol diacrylate, hexanediol dimethacrylate, glycerol triacrylate, glycerol trimethacrylate, pentaerythritol triacrylate, pentaerythritol trimethacrylate and diallyl phthalate.

The use of the poly-(ethylenically unsaturated) compounds mentioned under (g) surprisingly makes it possible, inter alia, to achieve a high solids content during the emulsion copolymerization, and, at the same time, to achieve, in the finished dispersion, very good stability against coagulation of the batch. A content of at least 0.01% by weight, based on the total quantity of monomers, of one of the compounds mentioned under (g) in the quantity of monomer initially charged is required for this purpose, at least during the starting phase of the polymerization. The amount of poly-(ethylenically unsaturated) monomer, based on the total amount of monomers, should, in general, preferably be between 0.01 and 20% by weight, particularly preferentially 0.02 - 10% by weight and especially 0.02 - 5% by weight.

As a result of adding the poly-(ethylenically unsaturated) monomer which acts as crosslinking agent, it is possible to prepare latices containing partly or completely crosslinked particles which, at solids contents of up to approx. 55% by weight, can have approximately monodisperse particle size distributions and average particle diameters within the range from 0.02 to 5 μm. It is possible to prepare particles ranging from a $oft, elastic consistency to a hard, brittle, highly-crosslinked structure.

Examples of preferred monomer combinations are acrylate or methacrylate monomers as mono-(olefinically unsaturated) compounds, and divinylbenzene as a polyunsaturated compound. Examples of particularly preferred combinations are those comprising methyl methacrylate, butyl acrylate and divinylbenzene; or styrene, butyl acrylate and divinylbenzene; or styrene, methyl methacrylate and divinylbenzene; or methyl methacrylate, butyl acrylate, diVinylbenzene, methacrylic acid and/or acrylic acid; or styrene and divinylbenzene; or styrene, acrylonitrile and divinylbenzene; or vinyl acetate and butanediol dimethacrylate; or methyl methacrylate, butyl acrylate and butanediol dimethacrylate; or acrylonitrile and divinylbenzene; or vinyl chloride and divinylbenzene.

The composition of the monomers should preferably be selected so that the content of hydrophilic monomers, such as, for example, acrylic acid, methacrylic acid, acrylonitrile, hydroxyethyl methacrylate, glycidyl methacrylate, maleic acid, maleic acid half-ester and the like is not more than 25% by weight, preferably 15% by weight, based on the total amount of monomers. The polymerization liquor is stirred at the stirring speeds customary for emulsion polymerizations, for example at 10–200, preferably 3–100, r.p.m.

Dispersions, according to the invention, of organic polymer particles can, for example, preferably be prepared in the following manner: 0.01 to 10% by weight of a water-soluble, radical-forming initiator, preferably 0.02–5% by weight and particularly preferentially 0.05–3.0% by weight, based on the total amount of monomers in the batch, is added to an aqueous system containing one or more types of ethylenically unsaturated monomers, of which 0.1–100% by weight, preferably 0.5–60% by weight and particularly preferentially 1–40% by weight, based on the amount of monomers initially, must be poly-(ethylenically unsaturated) monomers, and the polymerization is started, for example by thermolytic decomposition of the free-radical initiator. Instead of initially charging the total amount of the initiator, it is also possible to charge initially (in the aqueous liquor), only a fraction of the initiator, preferably 1–90% by weight, particularly preferentially 5–70% by weight and especially 10–60% by weight, based on the total amount of the initiator, and to meter in the residual amount subsequently as an aqueous solution together with the still outstanding amount of monomers.

The proportion of monomers in the polymerization mixture initially charged, at the start of the polymerization reaction in mixture which is designated as preliminary polymerization, is preferably 0.01–30% by weight, particularly preferentially 0.1–25% by weight and especially 1–20% by weight, based on the total amount, initially introduced, of aqueous phase and non-aqueous monomer phase.

The duration of the preliminary polymerization is between 0.1 minute and 3 hours, preferably 0.5 minute to 2 hours and particularly preferentially 1 minute to 1 hour. The polymerization temperature is usually within a temperature range at which the initiator or the initiator system has a half-life time of decomposition between 20 minutes and 15 hours. After the completion of the preliminary polymerization, the amounts of the monomer(s) and, when appropriate, of the residual initiator still outstanding are metered into the polymerization batch. The rate of metering in the monomer(s) and, when appropriate, the residual initiator should be adjusted to match the decomposition rate of the initiator or the initiator system in such a way that monomer does not float or settle out during the polymerization.

The emulsion polymerizations according to the invention are preferably carried out within an acid pH range of <pH 7, preferably at pH 1 to 5.

The molecular weight of the polymers can be reduced in a known manner by the use of molecular weight regulators. Mercaptans, halogen-containing compounds and other radical-transferring substances are preferably used for this purpose. Butyl mercaptan, octyl mercaptan, dodecyl mercaptan, tetrakismercaptoacetylpentaerythritol, chloroform, carbon tetrachloride, trichloroethylene, trichlorobromomethane, bromoform and toluene are particularly preferred. Water-soluble peroxides, azo compounds or redox systems are preferably employed as radical-forming initiators. Examples of particularly preferred systems are Na, K or ammonium peroxydisulfate or Na, K or ammonium peroxydisulfate redox systems containing sulfides, sulfites or other reducing agents. Radical-forming initiators which are readily and completely soluble in water are preferred. The amount of the radicall-forming initiator is preferably 0.01 to 10% by weight, particularly preferentially 0.02–5% by weight and especially 0.05–3.0% by weight, based on the total amount of monomers.

The particle size of the polymer particles can, inter alia, be influenced by the nature of the monomers used and their solubility behavior in water, and also by the nature and amount of the water-soluble, radicalforming initiator used or by the mode in which it is metered in, and also by the nature and the amount used of the poly-(ethylenically unsaturated) comonomers which result in polymeric crosslinking reactions, and also the nature and amount of the mono-(ethylenically unsaturated) compounds which may be copolymerized with these comonomers in the preliminary polymerization and, in some cases, also in the main polymerization.

For some fields of use it can be advantageous to convert the aqueous dispersions obtained by the process according to the invention into non-aqueous dispersions.

In order to obtain non-aqueous dispersions according to the invention which are free from emulsifiers and protective colloids, either the polymerization described above is carried out in a mixture of water and an inert, non-aqueous organic compound, or, after polymerization has been carried out in an aqueous phase, an adequate quantity of a non-aqueous organic compound or a mixture of such compounds is added and the water is removed. These water-soluble organic compounds are preferably organic compounds containing OH groups or mixtures of such compounds. Glycolic compounds or mixtures thereof with water-miscible organic compounds, or in some cases also with water-immiscible further organic compounds, are particularly preferred. Thus dispersing media composed of ethylene glycol or of mixtures containing ethylene glycol are particularly preferred for the use of the polymer dispersions for pigmenting, for example, polyester raw materials which can be used, for example, for the production of sheets, fibers or filaments.

The water-miscible, non-aqueous dispersing medium or the water-miscible, non-aqueous, liquid phase preferably contains inert, water-soluble organic compounds which contain hydroxyl groups and in which the OH groups can be completely or partly substituted, preferably etherified or esterified. Compounds containing unsubstituted OH groups are preferred. Polyhydric alcohols, in particular dihydric alcohols, such as glycols or polyglycols, and also polyglycol ethers in which the free hydroxyl groups can in some cases be substituted, are particularly preferred.

As inert, non-aqueous constituents, the dispersing medium can contain, for example, the following: monoalcohols, such as methanol, ethanol, isopropanol, butanol, amyl alcohols, iso-$C_{13}$ alcohol, lauryl alcohol, oleyl alcohol or butyldiglycol, monoesters or diesters of glycol or polyglycols with lower carboxylic acids, ethylene glycol, propylene glycol, glycerol, glycerol esters or partial esters, glycerol ethers, butylene glycol, phenol or alkylphenols. In removing the water of the dispersion by distillation, it is preferable to use non-aqueous constituent$ having a boiling point higher than the boiling point of water. Ethylene glycol is particularly preferred.

Water is preferably expelled from mixtures containing ethylene glycol by distillation under normal pressure or in vacuo. The use of entraining agents or ternary mixtures can be particularly advantageous when removing water by distillation. The water content remaining in the resulting dispersion depends on the end use of the dispersion, for example on the water-sensitivity of the system which is to be pigmented with the polymer particles. However, as the water content rises, both the viscosity and the density of the resulting dispersion can fall, which in both cases promotes the tendency to settle out and thus can have an adverse effect on the stability to storage.

The water content aimed at in the "non-aqueous" polymer dispersion is, therefore, preferably less than 20% by weight, particularly preferentially less than 10% by weight and very particularly preferentially less than 5% by weight, based on the dispersion.

Further fields of use for the polymers require the polymers to be used in an isolated form, for example in the form of dry powders, which can be obtained from the aqueous dispersion$, for example, by thin film evaporation, freeze-drying or, especially, by spray drying. The polymer powder which has been isolated in this manner can be incorporated into other raw materials or products. It can, however, also be processed by customary methods, without further treatment, as a polymer raw material sheets.

The invention is illustrated in greater detail by the examples below. Unless otherwise specified, the parts indicated in the examples are parts by weight.

EXAMPLE 1

100 parts of a monomer mixture composed of 818 parts of methyl methacrylate, 441 parts of butyl acrylate and 25.2 parts of divinylbenzene (50% strength by weight) were added to 1,780 parts of water in a polymerization vessel equipped with a stirrer. The mixture was heated to 80° C., and 51 parts of a solution of 2 parts of ammonium persulfate in 100 parts of water were added. After a preliminary polymerization of 20 minutes, the remainder of the monomer was metered in over the course of 7 hours. The remaining fractions of the initiator solution were added when the monomer had been completely metered in. The duration of the subsequent reaction was 1 hour at 80° C. The dispersion prepared by this method had a solids content of 39.9% by weight, an average particle size ($D_w$) of 0.57 μm and a particle size distribution $D_w/D_n$ of <1.1. The dispersion was stable and exhibited good stability to storage.

COMPARISON EXAMPLE 1

If the polymerization of Example 1 was carried out without the addition of divinylbenzene indicated in that example, the dispersion coagulated even before the monomer had been completely added.

EXAMPLE 2

50 parts of a monomer mixture composed of 400.5 parts of methyl methacrylate and 220.5 parts of butyl acrylate, and also 6.3 parts of divinylbenzene (50% strength by weight) were added to 886 parts of water in a polymerization vessel equipped with a stirrer. The aqueous mixture was heated to 80° C., and 25.5 parts of a solution of 1 part of ammonium persulfate in 50 parts of water were added. After 20 minutes, the remainder of the monomer was metered in over 7 hours. The remaining part of the initiator solution was added when the metering in was complete. The duration of the subsequent reaction was 1 hour at 80° C. The dispersion prepared by this method had a solids content of 40% by weight, at a particle size distribution $D_w/D_n$ of 1.05. The dispersion was stable and exhibited a good stability to storage. The average particle size ($D_w$) was 0.33 μm.

COMPARISON EXAMPLE 2

If the polymerization of Example 2 was carried out without the addition of divinylbenzene indicated in that example, the dispersion coagulated even before the monomer had been completely added.

EXAMPLE 3

724.6 parts of water, 6.3 parts of divinylbenzene (50% strength by weight) and 50 parts of a mixture of 315 parts of methyl methacrylate, 315 parts of butyl acrylate, 12.6 parts of methacrylic acid and 6.3 parts of acrylic acid were mixed together in a polymerization vessel equipped with a stirrer. The mixture was heated to 80° C., and a solution of 0.63 part of ammonium peroxydisulfate in 15 parts of water was added. After a preliminary polymerization of 20 minutes, the remainder of the monomer was metered in over 7 hours. Parallel with this, 1.26 parts of ammonium peroxydisulfate, dissolved in 30 parts of water, were metered in. When the metered addition was complete, a further 0.63 part of ammonium peroxydisulfate, dissolved in 15 parts of water, was added. The duration of the subsequent reaction was 1 hour at 80° C.

The dispersion prepared by this method had a solids content of 45% by weight at a particle size distribution $D_w/D_n$ of 1.05. The dispersion was stable and exhibited a good stability to storage. The average particle size ($D_w$) was 0.41 μm.

COMPARISON EXAMPLE 3

If the polymerization of Example 3 was carried out without the addition of divinylbenzene indicated in that example, the mixture coagulated even before the monomer had been completely added.

EXAMPLE 4

765 parts of water were emulsified together with 6.3 parts of divinylbenzene (50% strength by weight), 21 parts of sodium vinylsulfonate (30% strength by weight) and 50 parts of a monomer mixture composed of 346.5 parts of styrene, 283.5 parts of butyl acrylate, 12.6 parts of methacrylic acid and 6.3 parts of acrylic acid in a polymerization vessel equipped with a stirrer.

After the mixture had been warmed to 80° C., the polymerization was initiated by adding 5 parts of a solution of 25.2 parts of ammonium peroxydisulfate in 60 parts of water and also 5 parts of $Na_2S_2O_5$ in 60 parts of water. Metered addition of the remainder of the monomer and the remainder of the redox initiator solution was started after 20 minutes and was carried out over 7 hours.

When the metered addition was complete, further solutions of 0.25 part of ammonium peroxydisulfate in 5 parts of water and 0.5 part of $Na_2S_2O_5$ in 5 parts of water were added. The duration of the subsequent reaction was 1 hour at 80° C. The solids content of the dispersion was 40.5% by weight at a particle size distribution $D_w/D_n$ of <1.15. The dispersion was stable and exhibited good stability to storage. The average particle size ($D_w$) was 0.47 μm.

COMPARISON EXAMPLE 4

If the polymerization of Example 4 was carried out without the addition of divinylbenzene indicated in that example, the dispersion coagulated even before the monomer had been completely added.

EXAMPLE 5

Reformulation using ethylene glycol as the dispersing medium.

360 parts of ethylene glycol were added to 600 parts of a dispersion, prepared in accordance with Example 1, in a vacuum distillation apparatus equipped with a rotary evaporator. 328 parts of water were removed by distillation from the mixture under a vacuum of 15-20 mm Hg and at an external temperature of 100-105° C. The resulting dispersion had a solids content of 38% by weight.

We claim:

1. A pulverulent organic polymer free from emulsifier and protective colloid and substantially free from any stabilization additive which is not fixed by a covalent bond to the polymer,
   the polymer being in dry-powder form or in finely-dispersed form in a liquid medium,
   the polymer comprising particles having a distribution of particle size $D_w/D_n \leq 1.2$ within a particle diameter range between 0.02 μm and 5 μm,
   the polymer being a free-radically-initiated copolymerized emulsion copolymer, having units of monomer (a) and units of monomer (b), which is the same as that prepared by a polymerization comprising:
   a preliminary polymerization, in a polymerization medium, of poly-(ethylenically unsaturated) monomer (b) by itself or together with a partial amount of mono-(ethylenically unsaturated) monomer (a);
   the preliminary polymerization comprising that of at least 0.01 percent by weight, based on the total amount of monomers, of poly-(ethylenically unsaturated) monomer (b);
   metering into the polymerization medium remaining mono-(ethylenically unsaturated) monomer (a) or that together with any remaining amount of poly-(ethylenically unsaturated) monomer (b) and any remaining amount of initiator;
   completing polymerization of the resulting mixture to obtain a polymer dispersion;
   the mono-(ethylenically unsaturated) monomer (a) being a member selected from the group consisting of acrylic acid ester, methacrylic acid ester, a vinyl aromatic monomer, a vinyl ester, an ethylenically unsaturated monocarboxylic acid, an ethylenically unsaturated dicarboxylic acid, an ethylenically unsaturated halogen compound and sodium vinyl sulfonate; and the poly-(ethylenically unsaturated) monomer (b) being a member selected from the group consisting of divinylbenzene and butanediol dimethacrylate,
   the polymer having no more than 15% by weight of hydrophilic monomer units, based on the total amount of monomer units, and
   the amount of poly-(ethylenically unsaturated) monomer units being in the range of from 0.02 to %5 by weight, based on the total amount of monomer units.

2. A pulverulent polymer as claimed in claim 1 which is the same as that prepared by a polymerization comprising initially copolymerizing (a) with (b) in a polymerization reaction medium containing at least 0.01 percent by weight, calculated on the total monomer content, of (b).

3. A polymer as claimed in claim 2 in finely dispersed form in a liquid water-miscible inert organic medium.

4. A dispersion as claimed in claim 3 wherein the liquid medium is non-aqueous and comprises ethylene glycol.

5. A polymer as claimed in claim 2 in dry-powder form.

6. A pulverulent polymer as claimed in claim 1 which is the same as that prepared by a polymerization comprising initially polymerizing (b) by itself.

7. A pulverulent polymer as claimed in claim 1, wherein the poly-(ethylenically unsaturated) monomer comprises divinylbenzene.

8. A pulverulent polymer as claimed in claim 1, wherein the poly-(ethylenically unsaturated) monomer comprises butanediol dimethacrylate.

9. A polymer as claimed inn claim 1 in finely dispersed form in an aqueous medium.

10. A polymer as claimed in claim 1 which is partly or completely freed from the liquid dispersing medium.

11. A polymer as claimed in claim 1, wherein the polymerization medium is free from emulsifier and from protective colloid, the polymerization has been initiated by at least one water-soluble, free-radical-forming initiator, andd has a dispersing medium which is water or an aqueous solution containing at least one water-miscible inert organic compound.

12. A polymer as claimed in claim 11 wherein the dispersing medium is an aqueous solution containing an organic compound having hydroxy groups.

13. A polymer as claimed in claim 11 wherein the dispersing medium is an aqueous solution containing ethylene glycol.

14. A pulverulent organic polymer free from emulsifier and protective colloid and substantially free from any stabilization additive which is not fixed by a covalent bond to the polymer, the polymer being in dry-powder form or in finely-dispersed form in an aqueous or non-aqueous liquid medium, the polymer comprising particles having a distribution of particle size $D_w/D_n \leq 1.2$ within a particle diameter range between 0.02 μm and 5 μm, the polymer being a free-radically-initiated copolymerized emulsion copolymer, having units of monomer (a) and units of monomer (b), which is the same as that prepared by a polymerization comprising b1) initially polymerizing crosslinkable poly-(ethylenically unsaturated) monomer (b), optionally with mono-(ethylenically unsaturated) monomer (a), in a polymerization reaction medium containing at least 0.01 percent by weight, calculated on total monomer content of said polymer, of (b) and 2) polymerizing the thus obtained product further with any residual amounts of (a) and (b) required to obtain the emulsion copolymer; the mono-(ethylenically unsaturated) monomer (a) consisting essentially of at least one member selected from the group consisting of acrylic acid ester, methacrylic acid ester, a vinyl aromatic monomer, a vinyl ester, an ethylenically unsaturated monocarboxylic acid, an ethylenically unsaturated dicarboxylic acid, an ethylenically unsaturated halogen compound and sodium vinyl sulfonate; the poly-(ethylenically unsaturated) monomer (b) being at least one member selected from the group consisting if divinylbenzene and butanediol dimethacrylate; (a) and (b) together having no more than 15% by weight of hydrophilic monomer units, based on the total amount of monomer units; and the amount of poly-(ethylenically unsaturated) monomer units being in the range of from 0.02 to 5% by weight, based on the total amount of monomer units.

* * * * *